United States Patent
Gitta et al.

(10) Patent No.: US 11,795,877 B2
(45) Date of Patent: Oct. 24, 2023

(54) METHOD FOR MODULATING A TURBINE COOLING SUPPLY FOR GAS TURBINE APPLICATIONS

(71) Applicant: Siemens Energy, Inc., Orlando, FL (US)

(72) Inventors: Ashok Reddy Gitta, Charlotte, NC (US); Damien G. Teehan, St. Cloud, FL (US); Yan Yin, Oviedo, FL (US); Chirag Patel, Charlotte, NC (US); John T. Fetherolf, Jr., Rock Hill, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 17/906,756

(22) PCT Filed: Mar. 24, 2020

(86) PCT No.: PCT/US2020/024417
§ 371 (c)(1),
(2) Date: Sep. 20, 2022

(87) PCT Pub. No.: WO2021/194473
PCT Pub. Date: Sep. 30, 2021

(65) Prior Publication Data
US 2023/0122896 A1    Apr. 20, 2023

(51) Int. Cl.
*F02C 7/18*    (2006.01)
*F02C 9/18*    (2006.01)
*F01D 25/12*    (2006.01)

(52) U.S. Cl.
CPC .................. *F02C 7/18* (2013.01); *F02C 9/18* (2013.01); *F01D 25/12* (2013.01);
(Continued)

(58) Field of Classification Search
CPC ........... F02C 9/18; F02C 7/18; F05D 2230/80
See application file for complete search history.

(56) References Cited

U.S. PATENT DOCUMENTS

| 4,849,895 A | 7/1989 | Kervistin |
| 6,217,279 B1 * | 4/2001 | Ai ......................... F01D 11/001 |
| | | 415/110 |

(Continued)

FOREIGN PATENT DOCUMENTS

EP    3594474 A1    1/2020

OTHER PUBLICATIONS

PCT International Search Report and Written Opinion of International Searching Authority dated Dec. 17, 2020 corresponding to PCT International Application No. PCT/US2020/024417 filed Mar. 24, 2020.

*Primary Examiner* — Katheryn A Malatek (57) ABSTRACT

A method of modulating a cooling supply in a gas turbine engine includes providing the engine comprising a compressor section and a turbine section and including a cooling flow circuit, the cooling flow circuit supplying a cooling air flow from a compressor cavity in the compressor section to a blade ring cavity in the turbine section, wherein the cooling flow circuit includes a main line with a full capacity valve, measuring a first pressure in the blade ring cavity, measuring a second pressure in the compressor cavity, adjusting, by a control system, the opening of the full capacity valve to control the cooling air flow through the main line in order to maintain a target pressure ratio, wherein the pressure ratio defined as a ratio of the first pressure to the second pressure. The method is performed in an ambient temperature operating range of the engine.

20 Claims, 8 Drawing Sheets

(52) U.S. Cl.
CPC ...... *F05D 2220/32* (2013.01); *F05D 2230/80* (2013.01); *F05D 2260/20* (2013.01)

(56) References Cited

U.S. PATENT DOCUMENTS

| | | | |
|---|---|---|---|
| 6,615,574 B1 * | 9/2003 | Marks | F02C 7/18 60/772 |
| 8,495,883 B2 | 7/2013 | Foust et al. | |
| 2001/0018824 A1 * | 9/2001 | Leone | F01D 25/12 60/772 |
| 2003/0046938 A1 * | 3/2003 | Mortzheim | F01D 25/12 60/782 |
| 2011/0135456 A1 * | 6/2011 | Takahashi | F01D 11/24 415/180 |
| 2011/0138818 A1 * | 6/2011 | Mizukami | F02C 7/08 60/39.83 |
| 2013/0067928 A1 * | 3/2013 | Arias Chao | F02C 6/08 60/785 |
| 2018/0010520 A1 * | 1/2018 | Iwasaki | F01D 5/187 |
| 2018/0283195 A1 * | 10/2018 | Ortiz | F01D 11/20 |
| 2018/0340468 A1 * | 11/2018 | Takamura | F02C 9/18 |
| 2022/0090517 A1 * | 3/2022 | Shimmyo | F23R 3/46 |

\* cited by examiner

METHOD FOR MODULATING A TURBINE COOLING SUPPLY FOR GAS TURBINE APPLICATIONS

BACKGROUND

Aspects of the disclosure generally relate to gas turbine technology and more particularly to a method for modulating a turbine cooling supply for cooling gas turbine components.

Gas turbine engines operate at high temperatures to assure maximum efficiency and minimize undesirable emissions. For the life of the components in the turbine section of the gas turbine engine, which operates under the highest temperatures in the engine, the components are cooled to prevent melting and other adverse effects from the extreme temperatures.

BRIEF SUMMARY

In one construction, a method of modulating a cooling supply in a gas turbine engine for cooling components within the engine is provided. The method includes providing the gas turbine engine comprising a compressor section and a turbine section and including a cooling flow circuit, the cooling flow circuit supplying a cooling air flow from a compressor cavity in the compressor section to a blade ring cavity in the turbine section, wherein the cooling flow circuit includes a cooling air supply main line with a full capacity valve. The method also includes measuring a first pressure in the blade ring cavity, measuring a second pressure in the combustor shell cavity, adjusting, by a control system in the gas turbine engine, the opening of the full capacity valve to control the cooling air flow through the cooling air main line in order to maintain a target pressure ratio, wherein the pressure ratio is defined as a ratio of the first pressure to the second pressure, and wherein the method is performed in an ambient temperature operating range of the gas turbine engine.

In another construction, a method of upgrading a gas turbine engine to accommodate for a reduced pressure margin in a cooling flow circuit between a compressor section and a turbine section is provided. The method includes providing a gas turbine engine including a cooling flow circuit supplying a cooling flow from a compressor cavity in the compressor section to a blade ring cavity in the turbine section, the cooling flow circuit comprising a cooling air bypass line including a small capacity valve in parallel with a cooling air supply main line including an orifice. The method also includes removing the cooling air bypass line in the cooling flow circuit, replacing the orifice in the cooling air supply main line with a full capacity valve, the full capacity valve including a diameter greater than a diameter of the small capacity valve. The method allows for the upgraded gas turbine to operate in an ambient temperature operating range.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

In order to cool gas turbine components in the turbine section of the engine, a cooling air flow may be routed from the compressor stages to certain turbine locations. A cooling air supply line may be utilized for this purpose. However, when upgrading the gas turbine engine to a different configuration, an increase in air pressure in the turbine section can affect the cooling flow so that the cooling air supply pressure is no longer able to provide sufficient flow to adequately cool the components.

Figure 1:
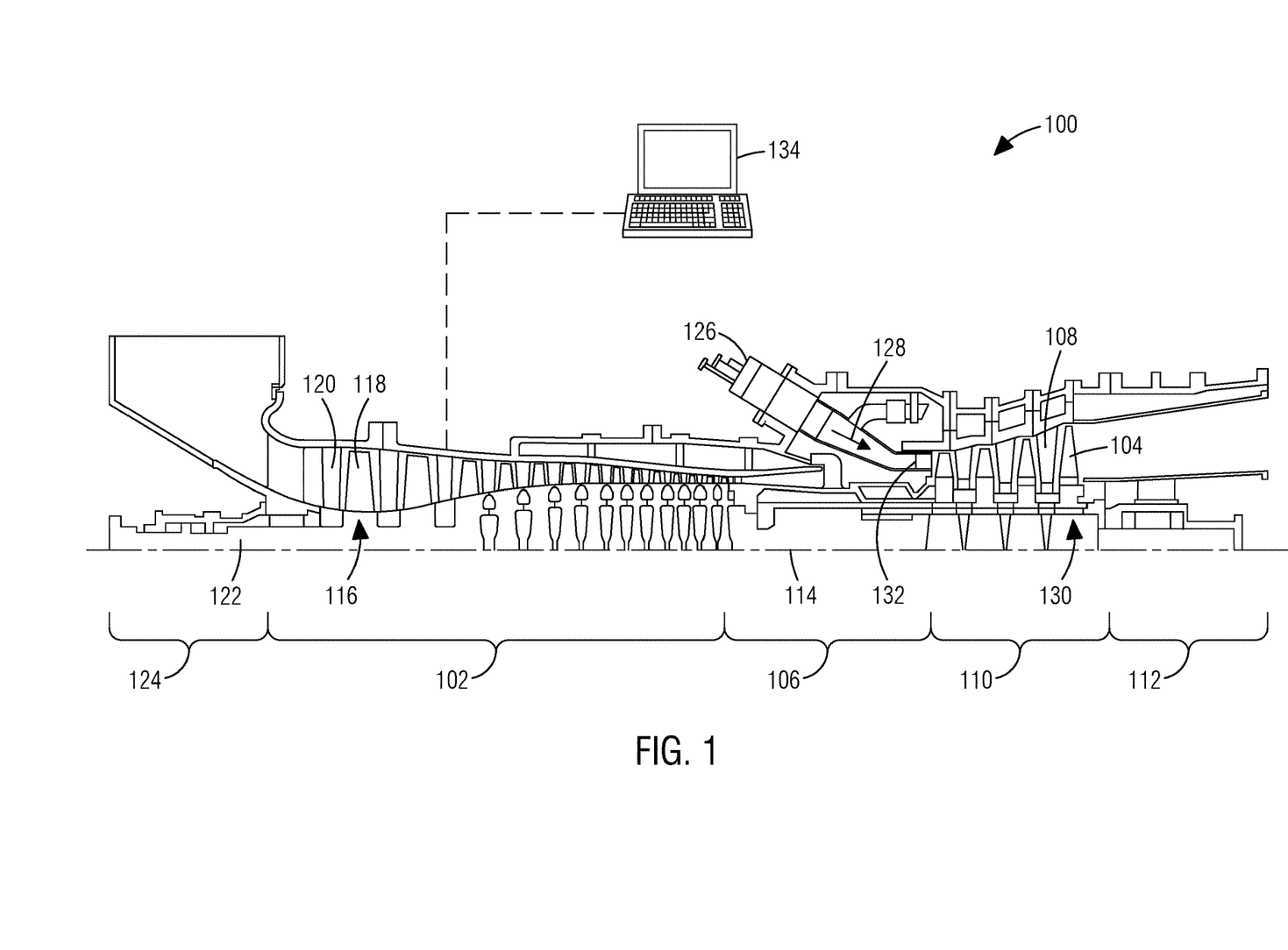
FIG. 1 is a longitudinal cross-sectional view of a gas turbine engine taken along a plane that contains a longitudinal axis or central axis.

FIG. 1 illustrates an example of a gas turbine engine 100 including a compressor section 102, a combustion section 106, and a turbine section 110 arranged along a central axis 114. The compressor section 102 includes a plurality of compressor stages 116 with each compressor stage 116 including a set of rotating blades 118 and a set of stationary vanes 120 or adjustable guide vanes. A rotor 122 supports the rotating blades 118 for rotation about the central axis 114 during operation. In some constructions, a single one-piece rotor 122 extends the length of the gas turbine engine 100 and is supported for rotation by a bearing at either end. In other constructions, the rotor 122 is assembled from several separate spools that are attached to one another or may include multiple disk sections that are attached via a bolt or plurality of bolts.

The compressor section 102 is in fluid communication with an inlet section 124 to allow the gas turbine engine 100 to draw atmospheric air into the compressor section 102. During operation of the gas turbine engine 100, the compressor section 102 draws in atmospheric air and compresses that air for delivery to the combustion section 106. The illustrated compressor section 102 is an example of one compressor section 102 with other arrangements and designs being possible.

In the illustrated construction, the combustion section 106 includes a plurality of separate combustors 126 that each operate to mix a flow of fuel with the compressed air from the compressor section 102 and to combust that air-fuel mixture to produce a flow of high temperature, high pressure combustion gases 128. Of course, many other arrangements of the combustion section 106 are possible.

The turbine section 110 includes a plurality of turbine stages 130 with each turbine stage 130 including a number of rotating turbine blades 104 and a number of stationary turbine vanes 108. The turbine stages 130 are arranged to receive the combustion gas 128 from the combustion section 106 at a turbine inlet 132 and expand that gas to convert thermal and pressure energy into rotating or mechanical work. The turbine section 110 is connected to the compressor section 102 to drive the compressor section 102. For gas turbine engines 100 used for power generation or as prime movers, the turbine section 110 is also connected to a generator, pump, or other device to be driven. As with the compressor section 102, other designs and arrangements of the turbine section 110 are possible.

An exhaust portion 112 is positioned downstream of the turbine section 110 and is arranged to receive the expanded flow of combustion gas 128 from the final turbine stage 130 in the turbine section 110. The exhaust portion 112 is arranged to efficiently direct the combustion gas 128 away from the turbine section 110 to assure efficient operation of the turbine section 110. Many variations and design differences are possible in the exhaust portion 112. As such, the illustrated exhaust portion 112 is but one example of those variations.

A control system 134 is coupled to the gas turbine engine 100 and operates to monitor various operating parameters and to control various operations of the gas turbine engine 100. In preferred constructions the control system 134 is typically micro-processor based and includes memory devices and data storage devices for collecting, analyzing, and storing data. In addition, the control system 134 provides output data to various devices including monitors, printers, indicators, and the like that allow users to interface with the control system 134 to provide inputs or adjustments. In the example of a power generation system, a user may input a power output set point and the control system 134 may adjust the various control inputs to achieve that power output in an efficient manner.

The control system 134 can control various operating parameters including, but not limited to variable inlet guide vane positions, fuel flow rates and pressures, engine speed, valve positions, generator load, and generator excitation. Of course, other applications may have fewer or more controllable devices. The control system 134 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
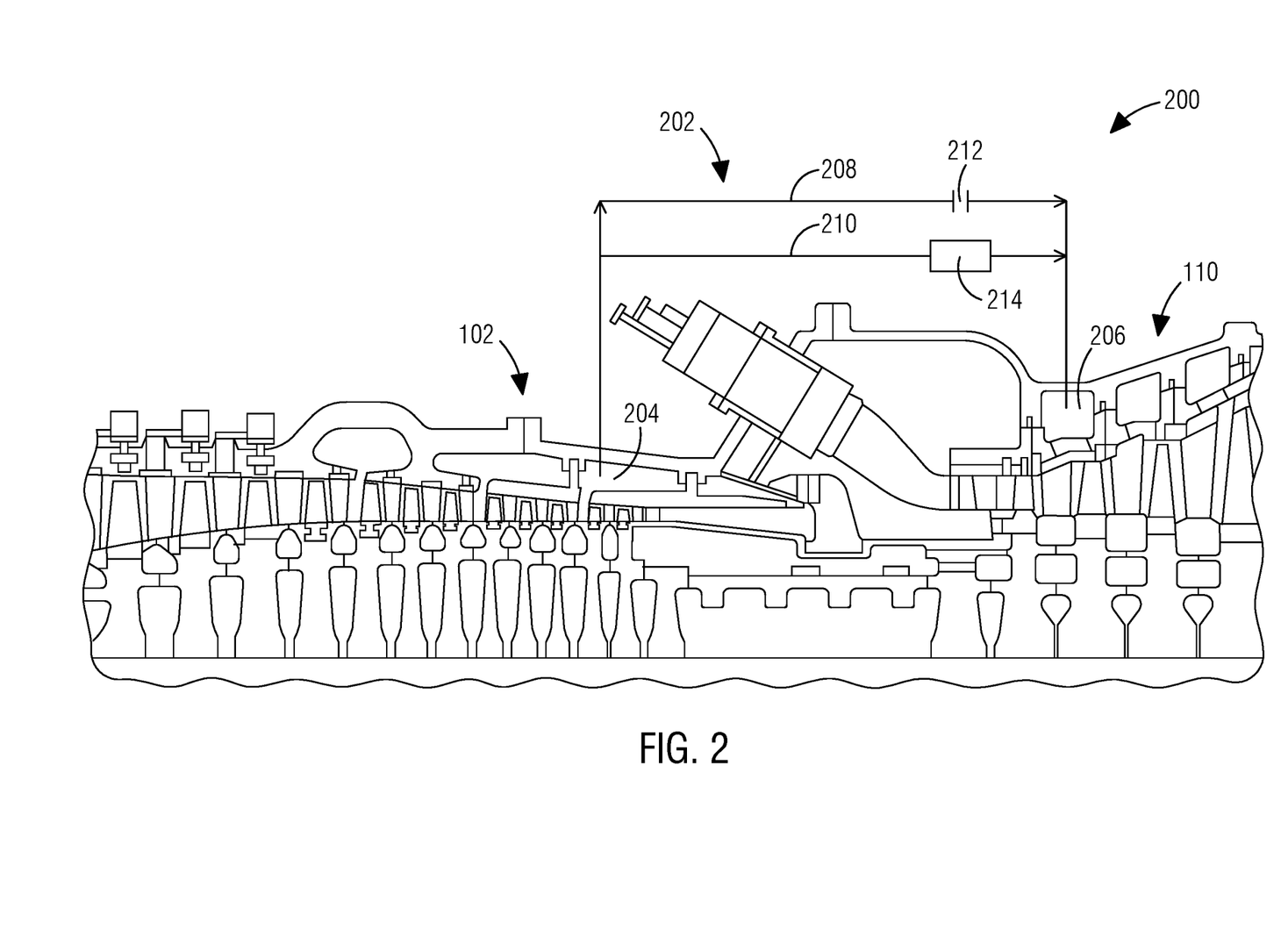
FIG. 2 illustrates a partial longitudinal cross-sectional view of a gas turbine engine having a current configuration of a cooling flow circuit.

FIG. 2 illustrates a partial longitudinal of a gas turbine engine 200 having a current configuration of a cooling flow circuit 202 utilized to modulate a cooling flow from the compressor section 102 to the turbine section 110 in order to cool turbine section components such as rotating turbine blades 104 and stationary vanes 108. The cooling flow circuit 202 includes a turbine cooling air supply main line 208 in parallel with a turbine cooling air supply bypass line

210. The turbine cooling air supply main line 208 includes an orifice 212 that comprises a plate having a hole with a fixed area supplying a constant cooling flow. The turbine cooling air supply bypass line 210 includes a small capacity valve 214 in a diameter range of 3-6 inches nominal size for supplying a variable cooling flow. A cooling air supply may be taken from a compressor cavity, or compressor bleed source 204, and routed through the cooling flow circuit 202 to blade ring cavity 206 where it is further distributed to turbine components for cooling. The choice of which compressor stage cavity to utilize as the compressor bleed source may depend, for example, on the particular cooling requirements of the components as well as the efficiency requirements of the engine.

For the current design of the gas turbine engine 200, the cooling flow circuit 202 enables sufficient modulation of the cooling flow for the required ambient temperature operating range of the gas turbine engine 200. For example, the required ambient temperature operating range of the gas turbine may be −29° C. to 50° C. The cooling flow circuit 202 for the gas turbine is also sufficient to account for pressure variations in the compressor as a result of changes in the ambient temperature. A sufficient pressure margin, i.e., the difference between the pressure in the blade ring cavity 206 and the compressor bleed source 204, is necessary to drive the cooling flow through the cooling flow circuit 202 to the turbine section 110.

However, when the gas turbine engine 200 is upgraded to a new design, the cooling requirement at the blade ring cavity 206 may be altered from what it was in the current design. The pressure margin between the compressor bleed source 204 and the blade ring cavity 206 may be reduced, with the result that the existing turbine cooling air supply main line 208 and the turbine cooling air supply bypass line 210 may become incapable to supply a sufficient turbine cooling flow on colder days due to the high pressure losses in the cooling flow circuit 202. In particular, the small capacity valve 214 in the turbine cooling air supply bypass line 210 may become incapable to provide the required cooling flow modulation for the required ambient temperature operating range. For example, the most difficult condition to provide an adequate cooling flow to the turbine components in the turbine section of the gas turbine engine 200 is a cold day, i.e., a day below an ambient temperature of approximately 15° C.

Figure 3:
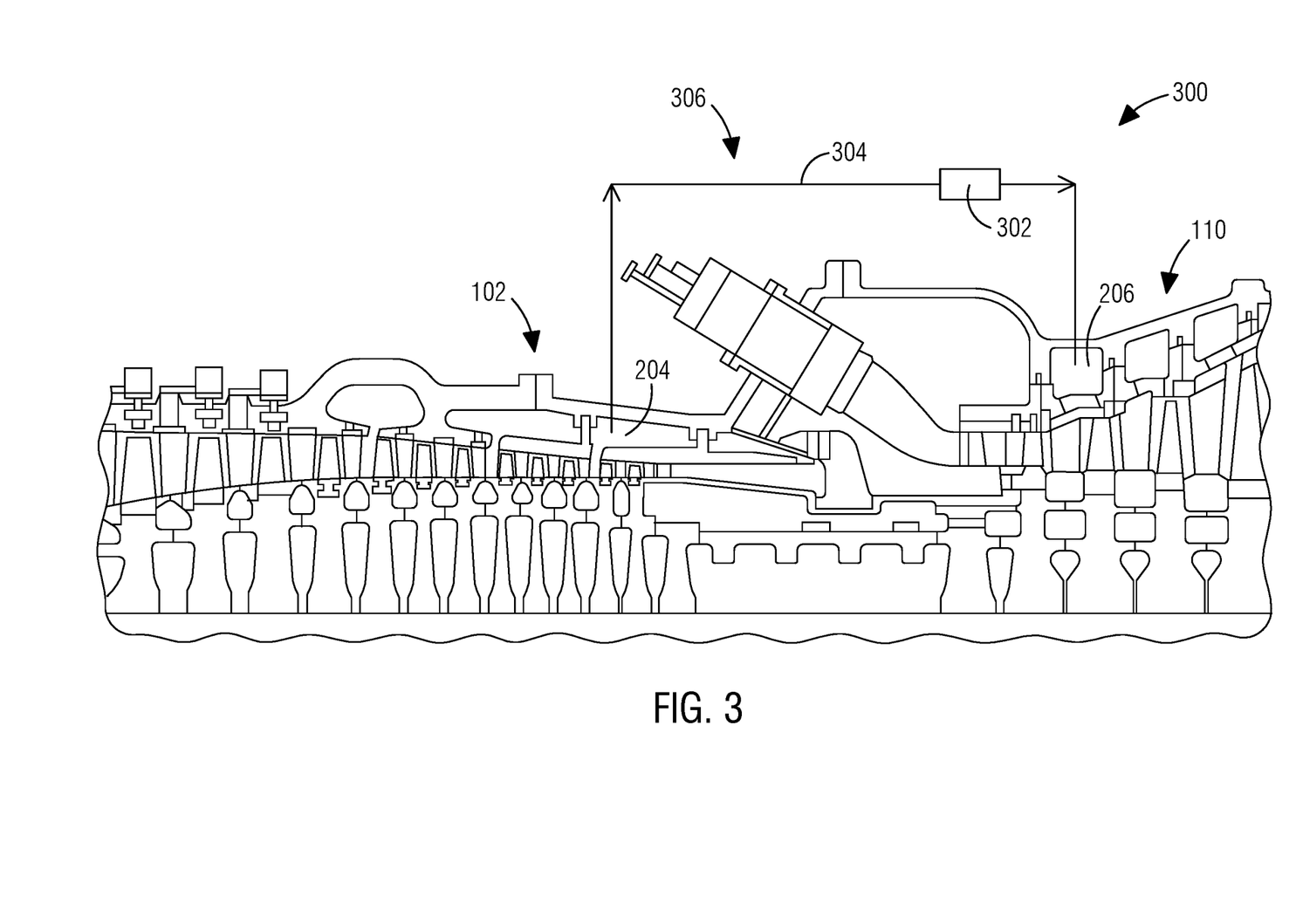
FIG. 3 illustrates a partial longitudinal cross-sectional view of an upgraded gas turbine engine having an embodiment of a proposed cooling flow circuit.

FIG. 3 presents a partial longitudinal of an upgraded gas turbine engine 300 including a proposed cooling flow circuit 306. The proposed cooling flow circuit 306 has an air supply line 304 having a full capacity valve 302. The full capacity valve 302 may be greater than the small capacity valve 214 in order to supply the required cooling air supply for the required ambient temperature operating range. In an embodiment, the diameter of the full capacity valve 302 may lie in a range of 10-14 inches nominal size. In a further embodiment, the diameter of the full capacity valve 302 may be equivalent to the diameter of the air supply line 304. The design of the proposed cooling flow circuit 306 replaces the orifice 212 of the turbine cooling air supply main line 208 with the full capacity valve 302. In addition, the turbine cooling air supply bypass line 210 from the current cooling flow circuit 202 is removed from the proposed cooling flow circuit 306. In the new design of the gas turbine engine, i.e., upgraded gas turbine engine 300, the proposed cooling flow circuit 306 reduces the pressure loss found in the current cooling flow circuit 202 (utilized in the upgrades turbine engine 300), allowing operation at a lower compressor bleed source 204 to blade ring cavity 206 pressure margin. With reduced pressure margin between the compressor bleed source 204 and the blade ring cavity 206, the small capacity valve 214 in the current turbine cooling air supply bypass line 210 would be incapable of providing the necessary cooling flow modulation for the required ambient temperature operating range. A larger orifice 212 on the cooling air supply main line would be needed to supply more cool air flow, however, the bigger orifice results in an overflow on a cold day, for example 15° C. or colder, with loss of performance.

Figure 4:
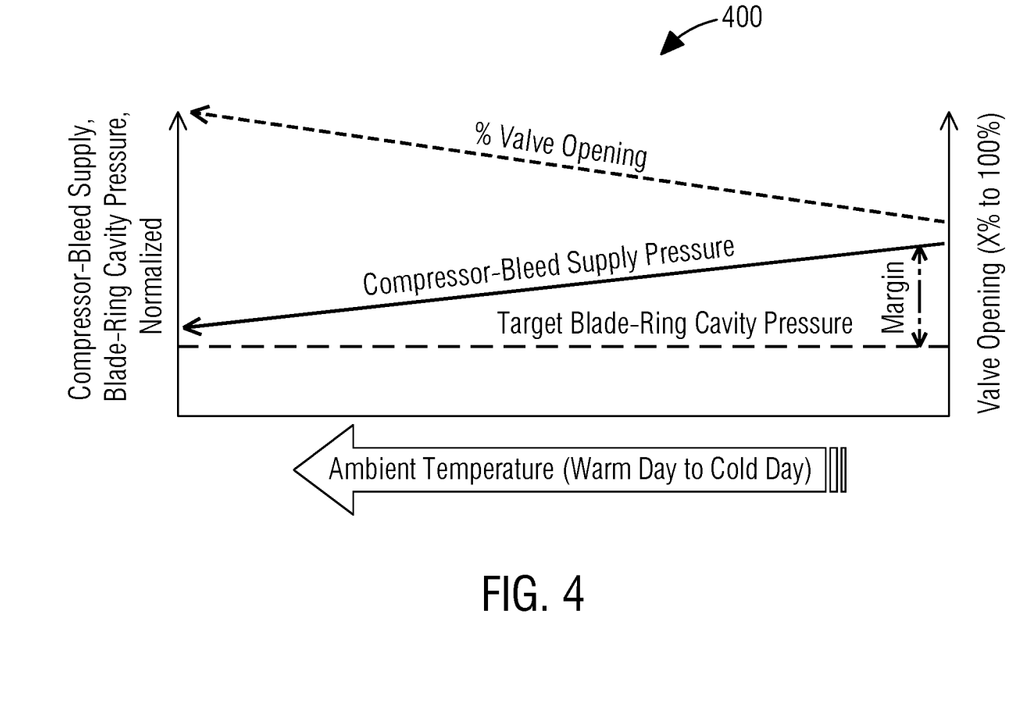
FIG. 4 illustrates a graphic representation of control logic to operate a full capacity valve in the proposed cooling flow circuit.

FIG. 4 illustrates a graphic representation of an embodiment of the control logic 400 used to operate the full capacity valve 302 in the proposed cooling flow circuit 306. The control logic instructions may be found on a processor in the control system 134 for the gas turbine engine 300. The embodiment of the control logic 400 shown in FIG. 4 may be utilized in the required ambient temperature operating range. The full capacity valve 302 opening position may be adjusted to maintain a set pressure value at the blade ring cavity 206. Pressure measurements within the blade ring cavity 206 and the compressor bleed source 204 may be measured using a pressure sensor disposed within each respective cavity 204, 206. Maintaining a set pressure value within the blade ring cavity is desired to ensure turbine cooling flow requirements are met across operation range without overflowing, which results in performance loss.

During warm day operations, for example from 15° C. to 50° C., the compressor bleed source 204 pressure will have enough pressure margin over the required blade ring cavity 206 pressure, so that the full capacity valve 302 may be partially open, i.e., 30% to 50% open, to maintain the required blade ring cavity 206 pressure. As seen in the control logic 400 of FIG. 4, during cold day operations (below 15° C. to approximately −5° C.) the pressure margin between the compressor bleed source 204 and the required blade ring cavity 206 pressure reduces and triggers the opening of the full capacity valve 302 to maintain the blade ring cavity 206 pressure. Once triggered, i.e. in the cold day operation range, the opening of the valve may be adjusted between 40% and 100% open in order to maintain the blade ring cavity pressure.

While during cold day and warm day operation, the proposed cooling flow circuit 306, may be adequate to modulate the cooling air flow in order to cool the turbine components and maintain a set pressure in the blade ring cavity 206, during extreme cold day operation (below −5° C.), even having the full capacity valve 302 opening fully open (100%) in the proposed cooling flow circuit 306, the compressor bleed source 204 pressure will not have enough pressure margin over the required blade ring cavity 206 pressure to maintain the blade ring cavity pressure.

Figure 5:
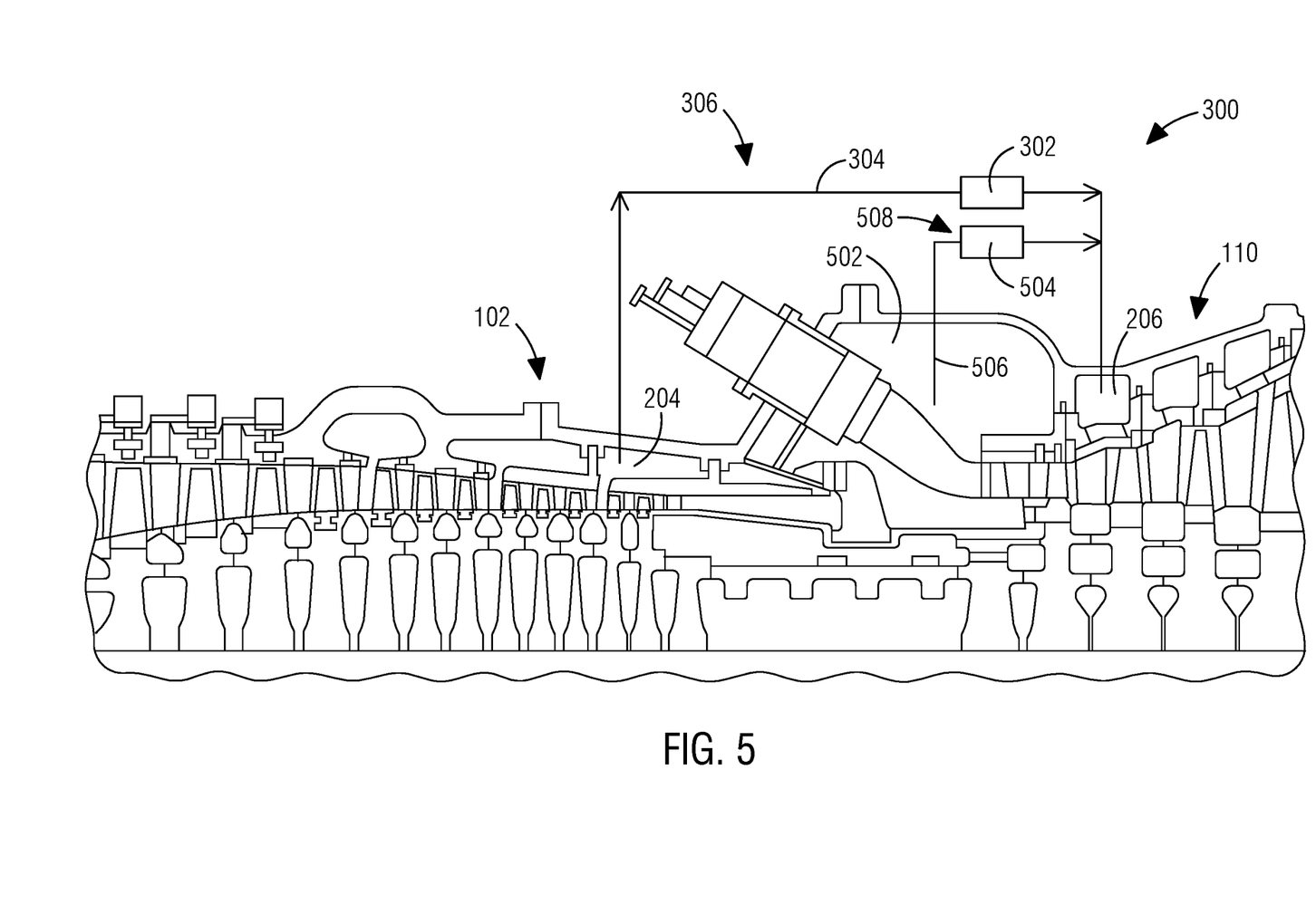
FIG. 5 illustrates a partial longitudinal cross-sectional view of an upgraded gas turbine engine having a further embodiment of a proposed cooling flow circuit.

Thus, in order to extend the operating ambient temperature range of the upgraded gas turbine engine 300 to provide sufficient cooling air supply under the extreme cold day (ambient temperature range of below −5° C. to −29° C.) condition, an additional cooling network may be utilized. FIG. 5 illustrates the proposed cooling flow circuit 306 including an additional cooling network 508 to handle ambient operating temperatures below −5° C. to −29° C. The additional cooling network 508 includes a shell cooling air supply line 506 which takes a cooling air supply from a combustor shell source 502, having air at the highest pressure and highest temperature in the gas turbine engine 300, and routes it to the blade ring cavity 206 during conditions when the gas turbine engine is operating in extreme cold day conditions. Opening a shell air control valve 504 in the shell cooling air supply line 506 engages the additional cooling network 508. The opening of the shell air control valve 504 may be controlled by the control system 134. While the pressurized cooling air supply in the combustor shell source 502 may address the inadequate supply pressure for the extreme cold day condition, this shell air may be too hot for the turbine components as the ambient temperature increases.

Thus, during extreme cold day conditions, the additional cooling network 508 may be engaged, and turbine cooling air is supplied from the combustor shell source 502 instead of the compressor bleed source 204 which has insufficient supply pressure during this ambient temperature condition. As the ambient temperature increases, the additional cooling network 508 must be disengaged because the shell air will be too hot for the turbine components and may damage them. Simultaneously, the turbine cooling air supply line 304 should be engaged in order to maintain the required cooling flow. Transitioning between the additional cooling network 508 and the turbine cooling air supply line 304 may be necessary for safe operation of the gas turbine engine.

In an embodiment, control logic, whose instructions may reside on the processor in the control system 134, may be utilized to switch between a cooling air flow supplied from the turbine cooling air supply line 304 under cold and warm day conditions to supplying a cooling air flow from the combustor shell source 502 via the additional cooling network 508 under extreme cold day conditions and back when the ambient temperature warms up to cold day and warm day conditions.

Figure 6:
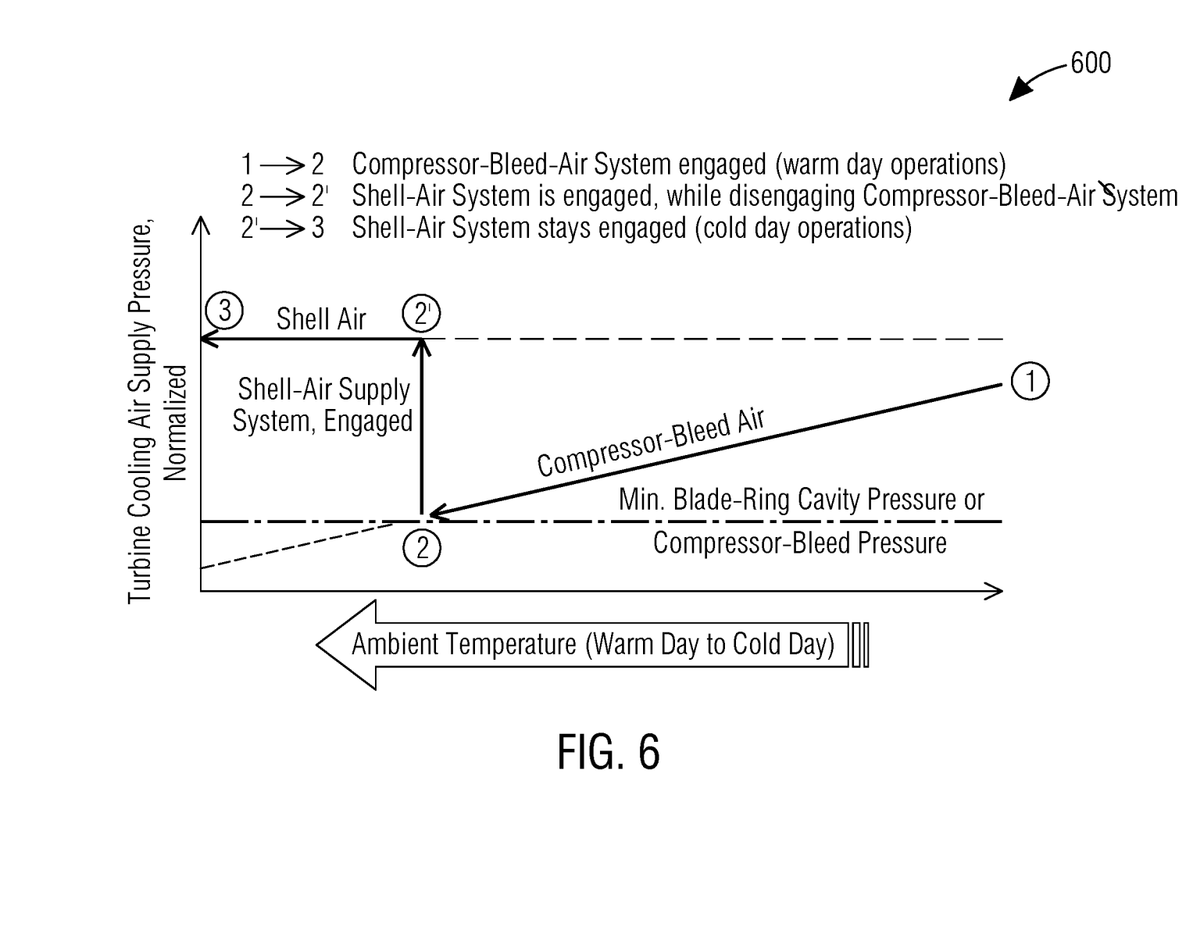
FIG. 6 illustrates a graphic representation of control logic to transition from supplying a cooling flow from the compressor bleed source to supplying a cooling flow from the combustor shell source during extreme cold day operation.

FIG. 6 illustrates a graphic representation of the control logic 600 to transition from supplying cooling air from the compressor bleed source 204 via turbine cooling air supply main line 208 to supplying cooling air from combustor shell source 502 via the shell cooling air supply line 506 during extreme cold day operations. The pressure in the blade ring cavity 206 or the pressure in the compressor bleed source 204 may be used as a trigger to engage the additional cooling network 508. The pressure in each of blade ring cavity 206 and/or the compressor bleed source 204 may be measured utilizing sensors. In an embodiment, when the pressure margin falls below a predetermined threshold, the additional cooling network 508 may be engaged supplying cooling air via the shell cooling air supply line 506 which has a much higher pressure than that of the compressor bleed source 204. The value of the predetermined threshold may depend on criteria such as the turbine stage of the blade ring cavity 206 and/or the compressor stage of the compressor bleed source. In an alternate embodiment, when the pressure in the compressor bleed source 204 is below a predetermined threshold the additional cooling network 508 may be engaged supplying cooling air via the shell cooling air supply line. The opening of the shell air control valve 504 is adjustable over the whole range (0-100%) depending on the pressure required to maintain the required cooling flow. In an embodiment, the engagement of the additional cooling network 508 precedes the closure of the full capacity valve 302 to avoid a condition where no cooling flow of the shell air flows into the turbine section 110.

Figure 7:
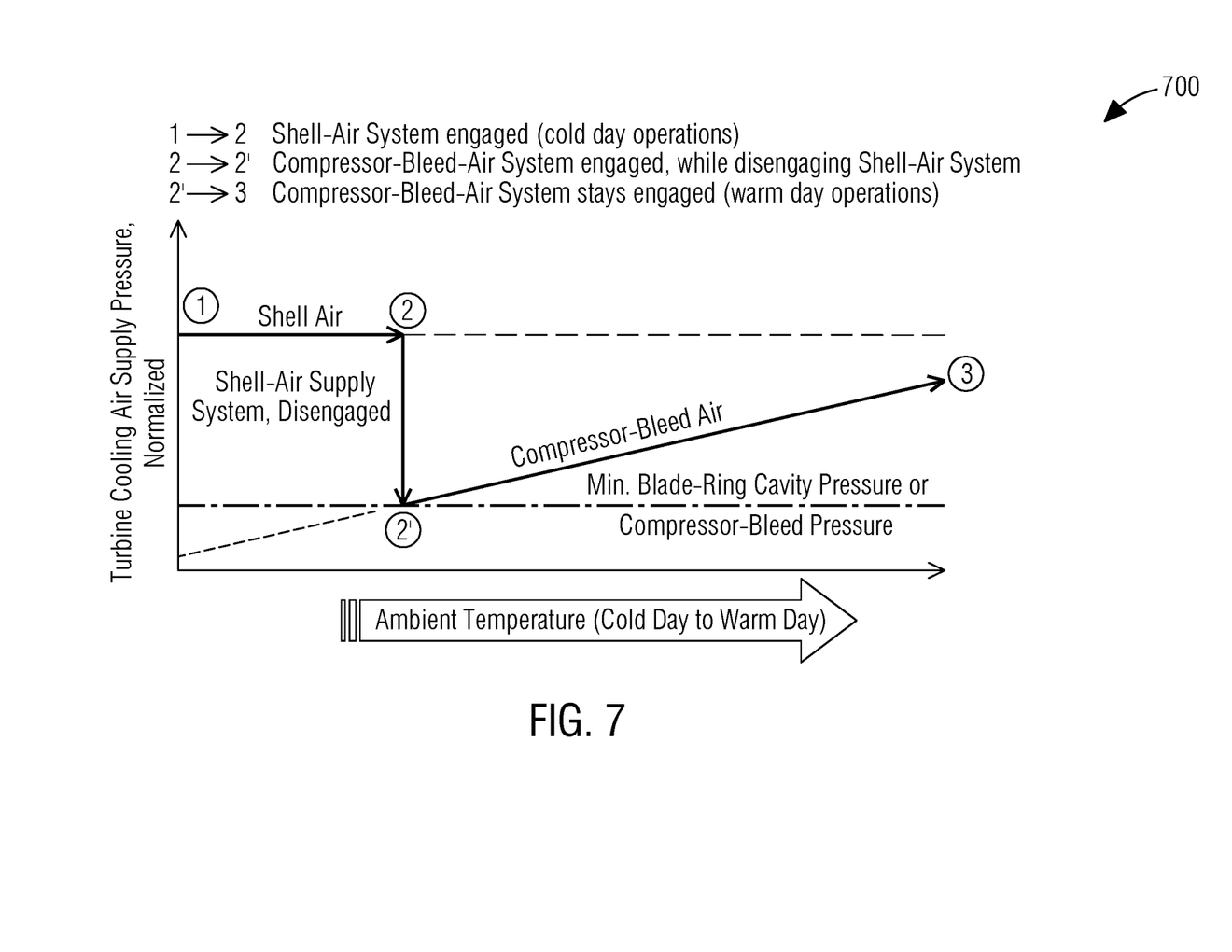
FIG. 7 illustrates a graphic representation of an embodiment of control logic to transition from supplying a cooling flow from the combustor shell source to supplying a cooling flow from the compressor bleed source during warm day operation.

FIG. 7 illustrates a graphic representation of an embodiment of the control logic 700 to transition from supplying cooling air from the combustor shell source 502 via the shell cooling air supply line 506 to supplying cooling air from the compressor bleed source 204 via the turbine cooling air supply line 304 during cold day and warm day operations. The pressure in the compressor bleed source 204 may be used as a trigger to disengage the additional cooling network 508 and engage the turbine cooling air supply line 304 by opening the full capacity valve 302. In an embodiment, when the pressure in the compressor bleed source 204 is above a predetermined threshold, the additional cooling network 508 may be disengaged by closing the shell air control valve 504 while the turbine cooling air supply line 304 is engaged by opening the full capacity valve 302. In an embodiment, the engagement of the turbine cooling air supply line 304 precedes the closure of the shell air control valve 504 to avoid a reverse flow of the shell air into the compressor section 102 and to prevent a condition where no cooling flow of shell air flows into the turbine section 110.

Figure 8:
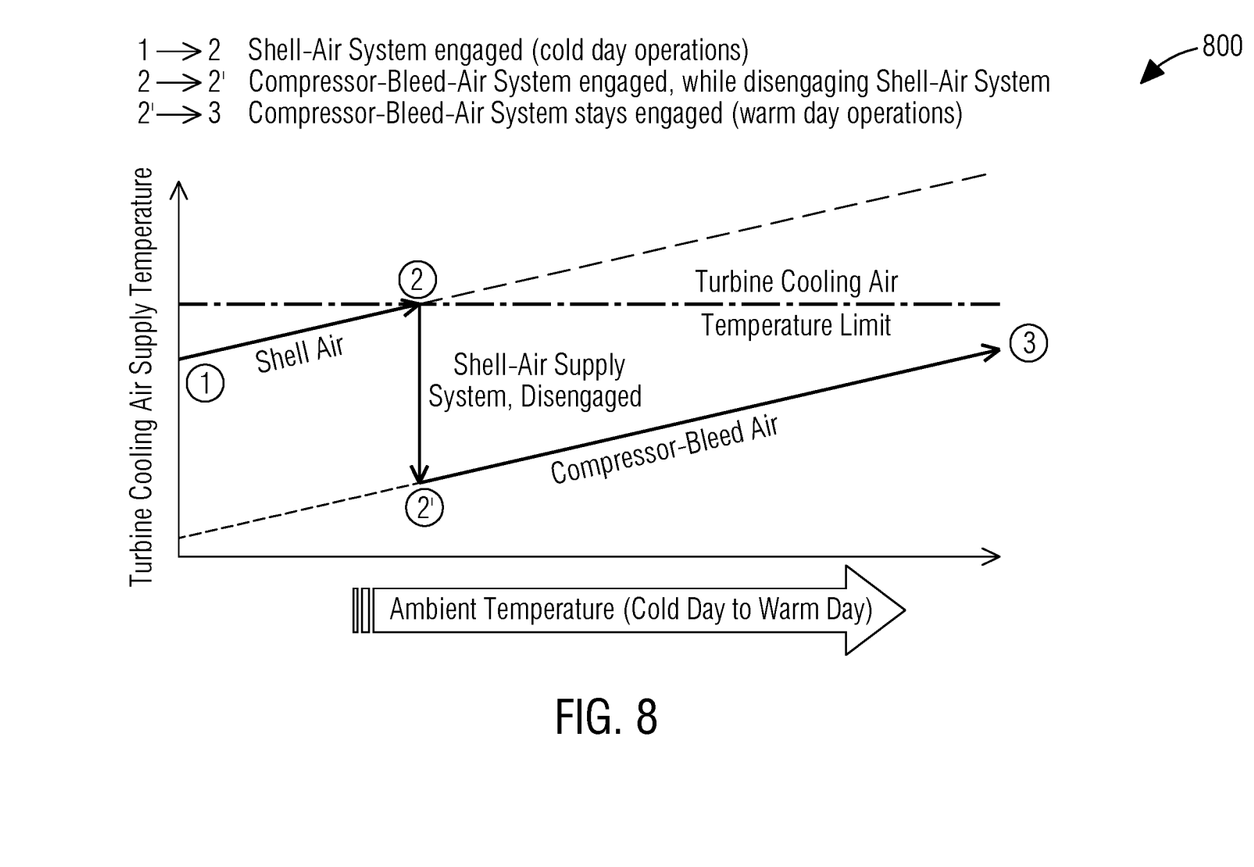
FIG. 8 illustrates a graphic representation of a further embodiment of control logic to transition from supplying a cooling flow from the combustor shell source to supplying a cooling flow from the compressor bleed source during warm day operation.

FIG. 8 illustrates a graphic representation of an alternate embodiment of control logic 800 to transition from supplying cooling air from the shell cooling air supply line 506 to the turbine cooling air supply line 304 during cold day and warm day operations. The temperature in the combustor shell source 502 may be used as a trigger to disengage the additional cooling network 508 and engage the turbine cooling air supply line 304 by opening the full capacity valve 302. A temperature in the combustor shell source 502 may be measured by a sensor disposed in the combustor shell cavity 502. In an embodiment, when the temperature in the combustor shell source 502 is above a predetermined threshold, the additional cooling network 508 may be disengaged by closing the shell air control valve 504 while the turbine cooling air supply line 304 is engaged by opening the full capacity valve 302. In an embodiment, the engagement of the turbine cooling air supply line 304 precedes the closure of the shell air control valve 504 to avoid a reverse flow of the shell air into the compressor section 102 and to prevent a condition where no cooling flow of shell air flows into the turbine section 110.

In use, the proposed methods enable cold and extreme cold days of the gas turbine engine such that cooling air with the appropriate temperature and pressure may be utilized to adequately cool components in the turbine section of the engine. For example, when upgrading the engine from a current configuration, replacing the orifice in the turbine cooling air supply main line with a full capacity valve reduces the pressure loss in the turbine cooling flow circuit. Reducing the pressure losses in the turbine cooling flow circuit allows operation at a lower pressure margin between the compressor bleed source and the blade ring cavity which occurs on cold days. In addition, with reduced pressure margin between the compressor bleed source and the blade ring cavity in the new design, the small capacity valve in the turbine cooling air supply bypass line would be incapable of providing the necessary cooling for modulation for all ambient temperature conditions without increasing the size of the orifice on the turbine cooling air supply main line. However, increasing the size of the orifice may result in overflowing the compressor bleed source. The turbine cooling air supply main line having a full capacity valve addresses this issue without loss of performance. Lastly, the additional cooling network extends the ambient temperature range to enable extreme cold day operation.

Other solutions to address the issue of supplying an adequate cooling flow to the components in the turbine section of the gas turbine could also include modifying the compressor to extract a flow from later compressor stages, supplying an external compressor to supplement or solely supply the cooling air to the turbine for cold day operations, heating the compressor inlet air on cold days to warmer temperatures using an inlet heating system, and operational changes such as a combination of reduced firing temperature and increased compressor mass-flow by opening the inlet guide vane.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of modulating a cooling supply in a gas turbine engine for cooling components within the engine, the method comprising:
   providing the gas turbine engine comprising a compressor section and a turbine section and including a cooling flow circuit, the cooling flow circuit supplying a cooling air flow from a compressor cavity in the compressor section to a blade ring cavity in the turbine section, wherein the cooling flow circuit includes a cooling air supply main line with a full capacity valve;
   measuring a first pressure in the blade ring cavity;
   measuring a second pressure in a combustor shell source;
   adjusting, by a control system in the gas turbine engine, the opening of the full capacity valve to control the cooling air flow through the cooling air supply main line in order to maintain a target pressure ratio, the pressure ratio defined as a ratio of the first pressure to the second pressure,
   wherein the method is performed in an ambient temperature operating range of the gas turbine engine.

2. The method of claim 1, wherein the diameter of the full capacity valve is in a range between 10 and 14 inches.

3. The method of claim 2, wherein the diameter of the full capacity valve is equivalent to the diameter of the cooling air supply main line.

4. The method of claim 1, wherein the ambient temperature operating range is −5° C. to 50° C.

5. The method of claim 4, wherein the cooling flow circuit further includes an additional cooling network to extend the ambient temperature operating range to below −5° C.,
   wherein the additional cooling network 508 includes a shell cooling air supply line configured to route a secondary cooling air flow from the combustor shell source to the blade ring cavity, and
   wherein the shell cooling air supply line includes a shell air control valve for modulating the secondary cooling air flow.

6. The method of claim 5, further comprising measuring a third pressure in the compressor cavity.

7. The method of claim 6, further comprising engaging the additional cooling network, when the third pressure drops below a predetermined pressure threshold, the engaging comprising:
   opening the shell line valve in the shell cooling air supply line to route the secondary cooling air flow from the combustor shell source to the blade ring cavity and closing the full capacity valve,
   wherein the opening and closing are controlled by the control system.

8. The method of claim 7, wherein the second predetermined pressure threshold is 60% of the third pressure.

9. The method of claim 7, wherein the opening is performed prior to the closing.

10. The method of claim 5, further comprising engaging the additional cooling network, when the first pressure drops below a first predetermined threshold, the engaging comprising:
    opening the shell air control valve in the shell cooling air supply line to route the secondary cooling air flow from the combustor shell source to the blade ring cavity 206 and closing the full capacity valve,
    wherein the opening and closing are controlled by the control system.

11. The method of claim 10, wherein the opening is performed prior to the closing.

12. The method of claim 10, further comprising adjusting an opening of the shell air control valve to maintain a cooling flow to the blade ring cavity.

13. The method of claim 5, further comprising disengaging the additional cooling network, when a characteristic is above a predetermined threshold, the disengaging comprising:
    opening the full capacity valve to route the cooling air flow from the compressor bleed source 204 to the blade ring cavity and closing the shell air control valve in the shell cooling air supply line,
    wherein the opening and closing are controlled by the control system.

14. The method of claim 13, wherein the opening is performed prior to the closing.

15. The method of claim 13, wherein the characteristic is the first pressure.

16. The method of claim 13, wherein the characteristic is a temperature in the combustor shell source.

17. The method of claim 16, wherein the third predetermined threshold is 400° C.

18. The method of claim 1, wherein when the target pressure ratio is below a predetermined value, the control system opens the full capacity valve and adjusts the valve opening to maintain the target pressure ratio in the blade ring cavity.

19. The method of claim 18, wherein the opening range of the valve opening is between 40% and 100% of a full capacity valve diameter.

20. A method of upgrading a gas turbine engine to accommodate for a reduced pressure margin in a cooling flow circuit between a compressor section and a turbine section, comprising:
    providing the gas turbine engine including a cooling flow circuit supplying a cooling flow from a compressor cavity in the compressor section to a blade ring cavity in the turbine section, the cooling flow circuit comprising a cooling air bypass line including a small capacity valve in parallel with a cooling air supply main line including an orifice;
    removing the cooling air bypass line in the cooling flow circuit; and
    replacing the orifice in the cooling air supply main line with a valve, the valve including a diameter greater than the diameter of the small capacity valve,
    wherein the cooling air supply line with the full capacity valve allows operation of the upgraded gas turbine engine in an ambient temperature operating range.

* * * * *